358-86. XR 3,562,650 SR
CATV SYSTEM WITH INCREASED CHANNEL CAPABILITIES
Filed Dec. 20, 1967 3 Sheets-Sheet 1
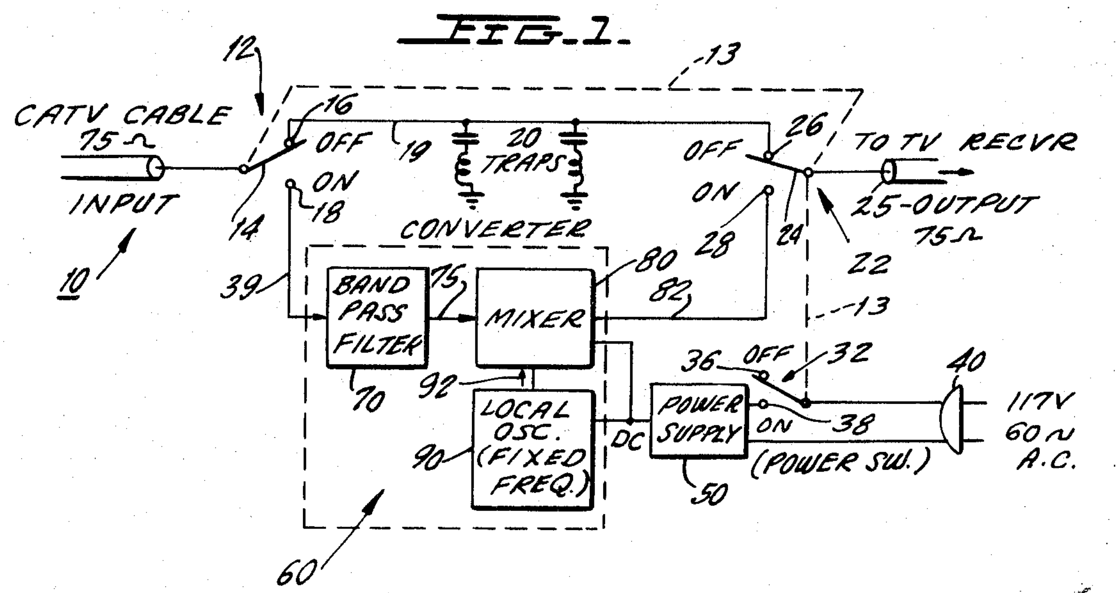
TX5003
X5113
Rm
FIG. 4
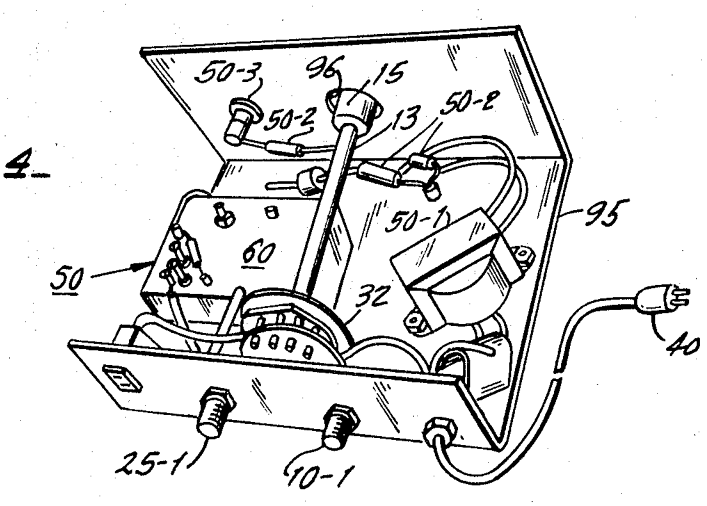
FIG. 5
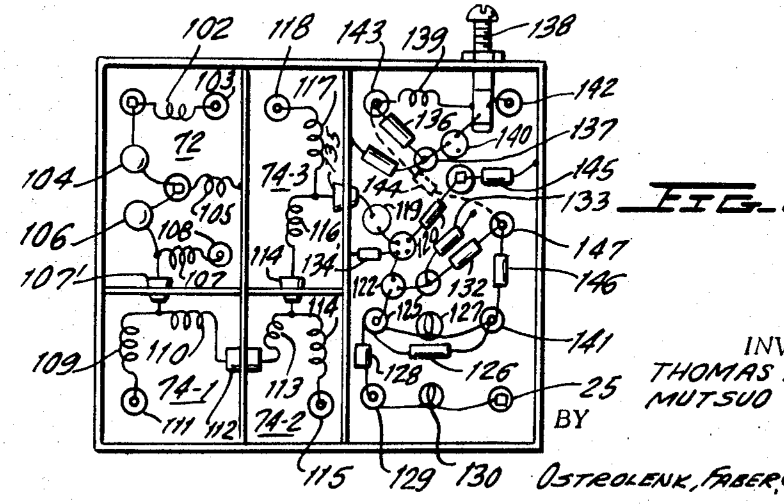
INVENTORS
THOMAS F. GOSSARD
MUTSUO NAKANISHI
BY
OSTROLENK, FABER, GERB & SOFFEN
ATTORNEYS

CATV SYSTEM WITH INCREASED CHANNEL CAPABILITIES

Filed Dec. 20, 1967 3 Sheets-Sheet 2

CATV SYSTEM WITH INCREASED CHANNEL CAPABILITIES

Filed Dec. 20, 1967

INVENTORS
THOMAS F. GOSSARD
MUTSUO NAKANISHI
BY
OSTROLENK, FABER, GERB & SOFFEN
ATTORNEYS

United States Patent Office 3,562,650
Patented Feb. 9, 1971

3,562,650

CATV SYSTEM WITH INCREASED CHANNEL CAPABILITIES

Thomas F. Gossard, Roselle, and Mutsuo Nakanishi, Maywood, Ill., assignors to Standard Kollsman Industries, Inc., Melrose Park, Ill., a corporation of Illinois Filed Dec. 20, 1967, Ser. No. 692,231
Int. Cl. H04h *1/02, 7/10*
U.S. Cl. 325—308 11 Claims

ABSTRACT OF THE DISCLOSURE

An arrangement for providing additional television channels and frequency converting such additional channels for selective tuning by the VHF tuner of a conventional television receiver. Such a television channel adding arrangement is shown in conjunction with a CATV System wherein the distribution cable provides the additional channels in conjunction with the conventional VHF broadcast channels.

Our invention relates to an arrangement for increasing the number of available television channels and more particularly for providing such additional channels to the subscribers of a CATV distribution system. Advantageously these additional television channels are made available by a simple frequency conversion technique at the subscriber's location, which does not require any modifications to the television receiver itself, and does not interfere with the locally transmitted channels.

Commercial television receivers conventionally include a VHF tuner for selecting individual ones of twelve television broadcast channels, designated channels 2 through 13. These channels have been assigned definite frequencies by the F.C.C. and the VHF tuner is designed in accordance with these broadcast frequencies. An additional group of television channels of a higher frequency, and designated the UHF band have also been prescribed by the F.C.C. Television sets of recent manufacture must include capabilities for receiving this UHF band in addition to the VHF band. However, there are a substantial number of television sets presently in use which are only capable of receiving the VHF band.

In order to improve the signal strength of broadcast channels at areas remotely located with respect to the television transmitter, and enhance the quality of reception in strong signal areas, the use of community antenna television systems has become increasingly common. Such systems, hereinafter referred to as CATV systems, provide for the transmission of the television signal to the user's home via coaxial cables. The coaxial cable signals will usually conform to the regionally originated television channels. A distribution CATV system for the UHF band of television channels is presently not feasible. Accordingly, such CATV systems have been limited to a maximum number of 12 VHF channels.

In addition to providing improved reception of the broadcast channels it is extremely desirable that the CATV distributor be able to provide additional channels of information e.g. stock market quotations, news or marketing information of interest to only a limited local market, local varsity sports etc. Such additional channels of information should be provided to the subscriber in a manner which does not require a modification of his television receiver tuning and may be converted in a simple manner to signals capable of reception by the conventional television receiver. Further, these additional television channels must be selected in a manner which will not cause interference with the other channels transmitted on the cable, nor interfere with the various harmonics of the signals generated at the television receiver.

Our invention achieves the above noted objectives by providing a unique frequency conversion system in which a successive plurality of additional channels distributed within the VHF frequency span between channels 6 and 7 are frequency converted to a similar successive plurality of television channels within the frequency span of channels 7 through 13. Thus, our invention permits seven additional channels to be transmitted over the CATV cable between channels 6 and 7. For convenience, we refer to these additional channels as 7A–13A. At the receiver the user may receive the conventional broadcast channels 2 through 13 without interference from additional channels 7A–13A. When it is desired to receive these additional channels, a switch is thrown in a separate converter for blocking the presentation of channels 2 through 13 to the TV receiver, and converting the additional mid-range channels 7A–13A to the frequencies of channels 7 through 13. By then moving the television VHF tuner between the channels 7 through 13 position the user is able to select individual ones of the seven additional channels 7A–13A.

In accordance with a further feature of such a channel adding system the output of the frequency converting channel adder may be presented to an additional frequency converter designed for the suppression of local signal interference. Such an additional frequency converter may be used in those localities wherein the locally transmitted broadcast signal is of a sufficient signal strength to cause double images with the CATV distributed channel of the same frequency. In order to avoid interference between the locally transmitted and CATV signals of the same frequency, the CATV signal is converted to a VHF channel which is not used in that locality. Appropriate frequency filters and traps are provided such that the output from the dual frequency converter will only be at the VHF frequency of the selected non-locally transmitted channel. The VHF tuner of the subscriber's television set remains tuned to this channel while the frequency conversion means are selectively tuned to provide either: one of the VHF broadcast channels converted to this single non-locally transmitted channel; or one of the additional channels, first converted to one of the upper band VHF channels, and then converted to the selected non-locally transmitted VHF channel. In accordance with a further feature of our invention the second converter may include additional frequency conversion means within its tuner for receiving still further channels, (e.g. such as 1 or 2 channels below the channel 2 frequency) and converting such further channels to the non-locally transmitted VHF channel.

Accordingly, a primary object of our invention is to provide a television receiving system having additional channel capabilities.

A further object of our invention is to provide in conjunction with a CATV system, a frequency conversion arrangement for allowing the transmission of additional television channels within the intermediate VHF frequency gap and selectively converting such channels to the input frequency capabilities of a conventional television receiver.

Another object of our invention is to provide a frequency converter, for use in conjunction with a CATV system, for receiving channels other than at the conventional broadcast frequencies and selectively converting such additional channels to the frequencies of VHF broadcast channels.

An additional object of our invention is to provide a method for adding additional channels to a CATV VHF distribution system which includes the steps of adding a plurality of additional television channels to the CATV distribution cable within the frequency gap between channels 6 and 7, and frequency converting such additional channels, at the subscriber's location, to a successive plurality of channels within the frequency span of broadcast channels 7 through 13.

Still a further object of our invention is to provide a method of adding additional channels without causing interference with the frequencies of the normal broadcast channels.

Still another object of our invention is to provide in combination with a television receiver having a VHF tuner for selecting a fixed number of channels, an auxillary frequency converting means for presenting additional channels to the receiver capable of tunable selection by the VHF tuner.

These as well as other objects of our invention will become readily apparent upon a consideration of the following description and drawings in which:

FIG. 1 is a simplified block schematic diagram showing the basic operation of our frequency conversion technique.

FIG. 4 is a top prospective view of such a fully assembled converter, including power supply and accompanying switches.

FIG. 5 is a component layout of the frequency converter portion thereof.

Figure 2:
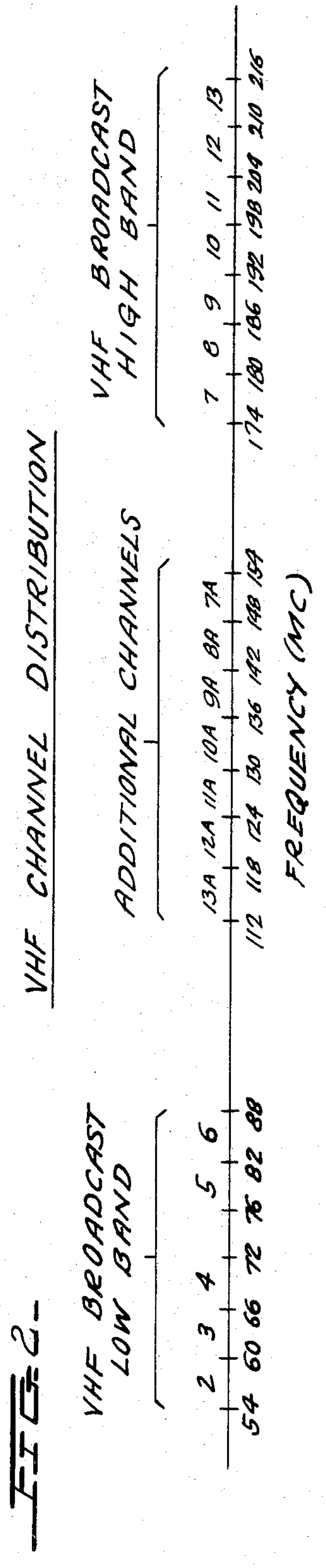
FIG. 2 shows the channel distribution of the assigned VHF channels, in conjunction with the additional supplementary channels provided by our frequency conversion technique.

In accordance with present F.C.C. requirements, local broadcast stations are assigned individual VHF channels designated as channels 2 through 13. Each of these channels includes a six megacycle frequency span The assigned frequencies of these commercial TV channels are shown in FIG 2. It is noted that channels 2 3 and 4 are necessively located with a 4 megacycle gap being provided between the upper extreme of channel 4 and the lower extreme of channel 5. Channels 5 and 6 are then successively located. Channels 2 through 6, bounded by the 54 to 88 megacycle band are commonly referred to as the low VHF band. The succeeding channels 7 through 13 are successively located between 174 and 216 megacycles. A substantial frequency band between 88 and 174 megacycles is left vacant to avoid interference with other transmitted signals e.g., broadcast FM. Commercially available television sets include a VHF tuner for selectively extracting the information from each of the channels 2 through 13 and converting same to a common receiver I.F. for subsequent processing in the video and audio portions of the receiver.

The selection of VHF channels for a particular locale, and the provision of a substantial frequency gap between channel 6 and 7 is provided to avoid interference between similarly transmitted frequencies. In a CATV system, however, the cable is shielded and the levels can be sufficiently controlled so as to permit channels in addition to the broadcast channels. In view of the possibility of adding additional channels to the CATV cable it becomes extremely desirous to provide some means at the subscriber's location for extracting the information from such additional channels in a manner such that the conventional type of commercial television receiver may process the information. The frequency conversion means at the subscribers location should advantageously be compatible with existing VHF television receivers, and not require any modification of the receiver itself. Our invention provides this by the simple expedient of a frequency converter which operates as shown in FIG. 1 and is located intermediate the CATV hookup and the antenna input of the television receiver.

Referring again to FIG. 2 the additional television channels are selected to minimize interference from second and third order cross products that may be generated in the distribution amplifier. We have found that particularly advantageous operation is obtained by the selection of successive six megacycle additional channels in the frequency span between 112 and 154 megacycles. It should be, however, understood that the designation of these frequencies is for illustrative purposes only and is not intended as a specific limitation of our invention. These successive chanels are conveniently designated by the notations 13A–7A.

A local oscillator frequency is selected such that the mixing of individual ones of the additional channels with such a local oscillator frequency will successively place such additional channels in the upper VHF broadcast band. In the illustrative embodiment a local oscillator frequency of 328 megacycles is selected. Hence, the mixing of this local oscillator frequency with the designated channel 13A (between the 112 and 118 megacycle band) will provide an output frequency at the difference frequency between 210 and 216 megacycles, the broadcast frequency of channel 13. Similarly, the mixing of designated additional channel 12A, (having a frequency span between 118 and 124 megacycles) with the 328 megacycles local oscillator frequency will provide an output frequency in the band of broadcast channel 12, (between 204 and 210 megacycles). It should now be apparent that the mixing of the other channels 11A through 7A with the local oscillator signal will likewise shift their frequencies to that of the VHF upper bands 11 through 7. However, inasmuch as the frequency conversion will serve to reverse the video-sound carrier relationship of the additional channels they must have a reverse characteristic as compared to the broadcast signals. Frequency conversion then serves to invert this relationship to provide standard output channels of the frequency converted additional channels 7A through 13A for presentation to the TV receiver.

Reference is now made to FIG. 1 which shows, in block diagrammatic form, a frequency converter constructed in accordance with our invention. The input signal, including the conventional broadcast channels 2 through 13 and additional channels 7A through 13A is presented to the subscriber station via a conventional type of CATV distribution cable 10. The input signal of cable 10 is presented to the common arm 14 of one section within a ganged arrangement of single-pole double-throw switches, comprising additional sections 22 and 32. The switches in FIG. 1 are shown in the position wherein the standard broadcast channels are presented to the TV receiver and the frequency converter of the instant invention is shown in the off position. In this condition the input signal at common arm 14 of input switch contact 16 such that it passes via circuit conductor 19 to switch contact 26 of output switch 22. Preferably, a trap indicated by the numerals 20 is provided to prevent the local oscillator signal from the TV receiver from feeding back into the cable system and possibly interfering with the additional channel reception at another subscribers cable connection. These traps are tuned to minimize the TV receiver local oscillator feed back from channels 5 and 6 which fall within the 112 to 154 megacycle band of the selected additional channel frequencies. Thus with the position of the gang switches 12, 22 and 32 as shown in FIG. 1, the frequency converter is deenergized and the conventional broadcast channels 2 through 13 will be routed from the input CATV cable 10 to the output cable 25, connected to the subscriber's TV receiver. Since the additional channels 7A–13A are intermediate the frequencies of channels 6 and 7, the tuner of the television receiver will be insensitive to such frequencies and the television set will operate as if such additional channels were not present.

When the user desires to receive the information of the additional channels 7A through 13A, the ganged switches 12, 22 and 32 are moved so at to make engagement with contacts 18, 28 and 38 thereof. During this time the input from the source 40 to power supply 50 is completed such that the appropriate energization is provided to the converter generally shown as 60. Further the input signal from CATV cable 10 is now routed via conductor 39 to the operative stages of the frequency converter.

Figure 6:
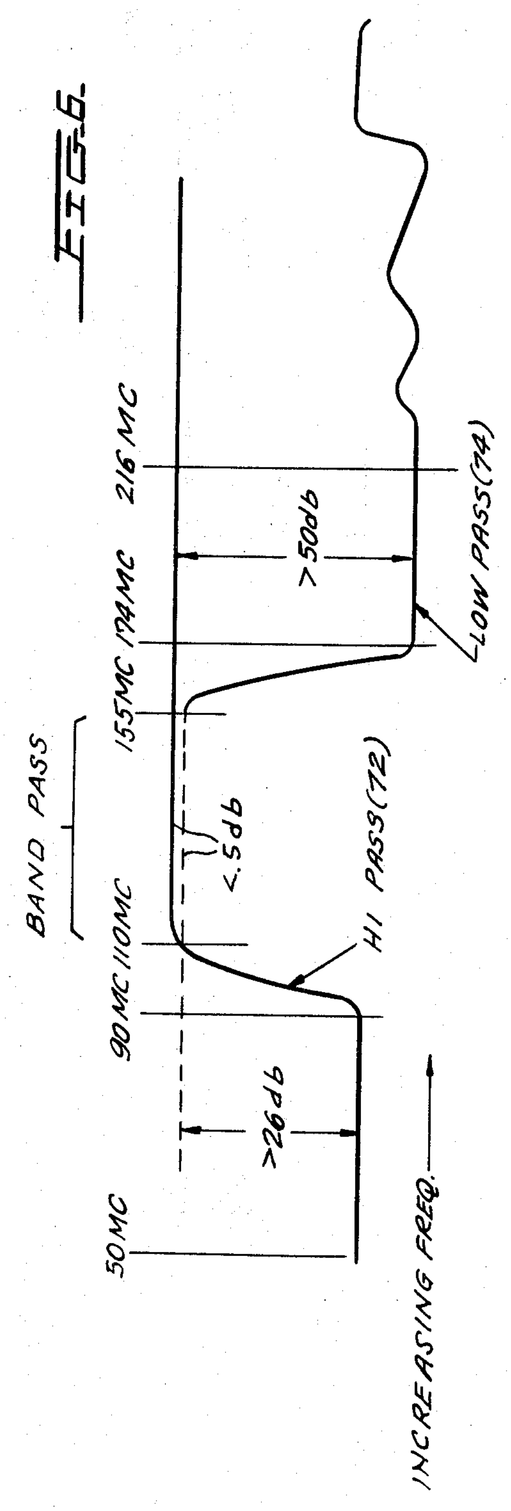
FIG. 6 shows the filter frequency characteristics of the embodiment therein in FIGS. 3–5.

The frequency converter first includes a band pass filter network generally designated as 70, the purpose of which is to filter out the broadcast TV channels 2 through 13 to avoid interference from these channels and leave the frequency span of channels 7 and 13 free for the frequency conversion thereto of channels 7A through 13A. The band pass filter 70 includes a high pass filter 72 and low pass filter 74 having the frequency characteristic as shown in FIG 6. The low band of VHF broadcast channels (channels 2 through 6) is filtered out by the high pass filter 72 having its low frequency cut-off point at approximately 90 megacycles. It has been found empirically that this filter should provide greater than 26 db attenuation for frequencies between 50–90 megacycles.

The high pass filter 72 is followed by a low pass filter 74 having its high frequency cut-off point at approximately 174 megacycles. Inasmuch as this frequency band must be free of interfering broadcast channels, so as to permit the up conversion of channels 7A through 13A, it has been found empirically that this portion of the band pass filter must provide greater than 50 db rejection for the 174 to 220 megacycle band. The output 75 of the band pass filter will hence be limited to the additonal channel signals 7A–13A intermediate broadcast channels 6 and 7, and in accordance with the illustrative embodiment lies within the range of 112 to 154 megacycles.

The filter output 75 is presented to a mixer 80 which also receives the output signal 92 of fixed frequency local oscillator 90. As discussed above the frequency of the local oscillator is selected such that the successive frequencies of the additional channels 7A–13A are simultaneously shifted into the successive frequencies of broadcast channels 7 through 13. Thus, the output 82 of the mixer will be such additional channels 7A–13A frequency converted to the frequencies of broadcast channels 7 through 13. This signal is then presented via switch contact 28 and common contact 24 to the cable 25 leading to the TV receiver. Accordingly, the user may then tune the conventional VHF tuner of his receiver between channels 7 through 13 and view individual ones of the additional channels 7A–13A.

Figure 3:
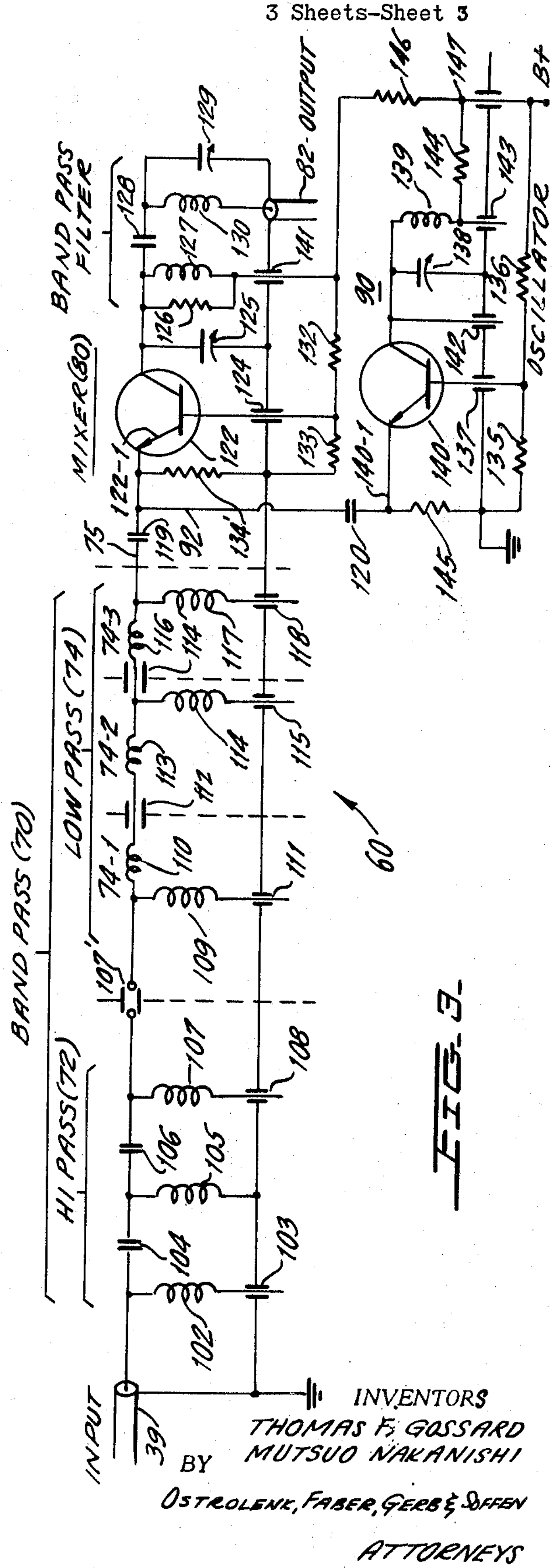
FIG. 3 is a schematic diagram of a frequency converter constructed in accordance with the instant invention.

Reference is now made to FIG. 3–5. The physical embodiment of the device schematically shown in FIG. 3 is mounted within a U-shaped housing 95 which also includes a protective cover (not shown). The triple ganged switch 12, 22, 32 includes a manually operable member 13 which extends through aperture 96 of the chasis and includes a knob 15 to permit manual on-off operation between the switch conditions shown in FIG. 1. The frequency converter portion including the band pass filter 70, mixer 80 and local oscillator 90 is enclosed within a separate sub-unit assembly indicated by the number 60, the physical layout of which is shown in FIG. 5.

The A.C. input to the unit is presented to the power supply which includes a power transformer 50–1 and appropriate rectifying components generally indicated by the numeral 50-2. Advantageously, the power supply includes a light 50–3 at the front of the housing assembly to indicate to the user when the unit is on. The input signal from the CATV distribution cable is presented to coaxial input 10–1 with the output signal therefrom to the users TV receiver being provided at a similar coaxial jack 25–1.

Referring now to FIGS. 3 and 5, the input signal to the converter received via cable input 10 is first presented to a high pass filter comprising a first pi section including inductors 102 and 105, and capacitor 104 in the common arm thereof; and a second pi section including the common inductor 105 and additional inductor 107 joined by a capacitor 106. The opposed ends of inductors 102 and 107 are connected to ground via feed through capacitors 103 and 108. The high pass filter section 72 is designed to have the frequency characteristic shown by the lower frequency portion of the FIG. 6 curve.

The output signal of the high pass filter is then presented via feed-thru capacitor 107′ to the triple stage low-pass filter 74, including sections 74–1, 74–2, and 74–3 in separate shielded housing compartments. Section 74–1 includes common connected inductors 109 and 110. The opposed terminal of inductor 109 is connected to ground via feed-through capacitor 111, and the opposed terminal of inductor 110 is connected via feed-through capactior 112 to inductor 113 in the following filter section 74–2. Inductor 113 is in turn connected to inductor 114 with the common terminal thereof being connected via feed-through capacitor 114′ to inductor 116 of the succeeding section 74–3. The opposite terminal of inductor 114 is connected to ground via feed through capacitor 115. Section 74–3 in turn includes additional inductor 117 with the commen output thereof being connected via blocking capacitor 119 to the mixer stage 80. The opposite terminal of inductor 117 is connected to ground via feed through capacitor 118. The low pass filter network is designed to provide a band pass characteristic as shown by the upper frequency portion of the FIG. 6 curve, that is frequencies above approximately 174 megacycles, including the VHF frequency band of channels 7 through 13 are appreciably rejected, with such rejection preferably being greater than 50 db.

The output of the band pass filter network which will be limited to the intermediate frequency band of channels 7A through 13A is then presented as one of the two inputs to the emitter terminal 122–1 of a conventional type of common-base mixer including transistor 122. The fixed frequency local oscillator signal output of oscillator transistor 140 is presented during this operation as an additional heterodyning signal to the emitter of mixer transistor 122. Local oscillator 90 is a conventional type of common base oscillator appropriately designed for sufficient stability over the anticipated temperature range. Mixer 80 includes a band pass filter at its output, comprising the components designated 125, 127, 128, 129, and 130, with capacitor 129 being adjustable. The output signal at cable 82 is then presented to the input of the subscriber's television receiver, via switch 22.

It is, therefore, seen that by virtue of our invention provision is made for an additional seven channels to be appropriately processed by the 12 channel VHF tuner of a typical television receiver. Thus the subscriber of the CATV system will have a maximum availability of 19 channels, with 12 of the channels being frequency selected by virtue of conventional tuning at the receiver; and the additional 7 channels being processed by utilizing the band pass filter and frequency conversion technique of our invention, and then the conventional receiver tuning is used for individual channel selection.

Figure 7:
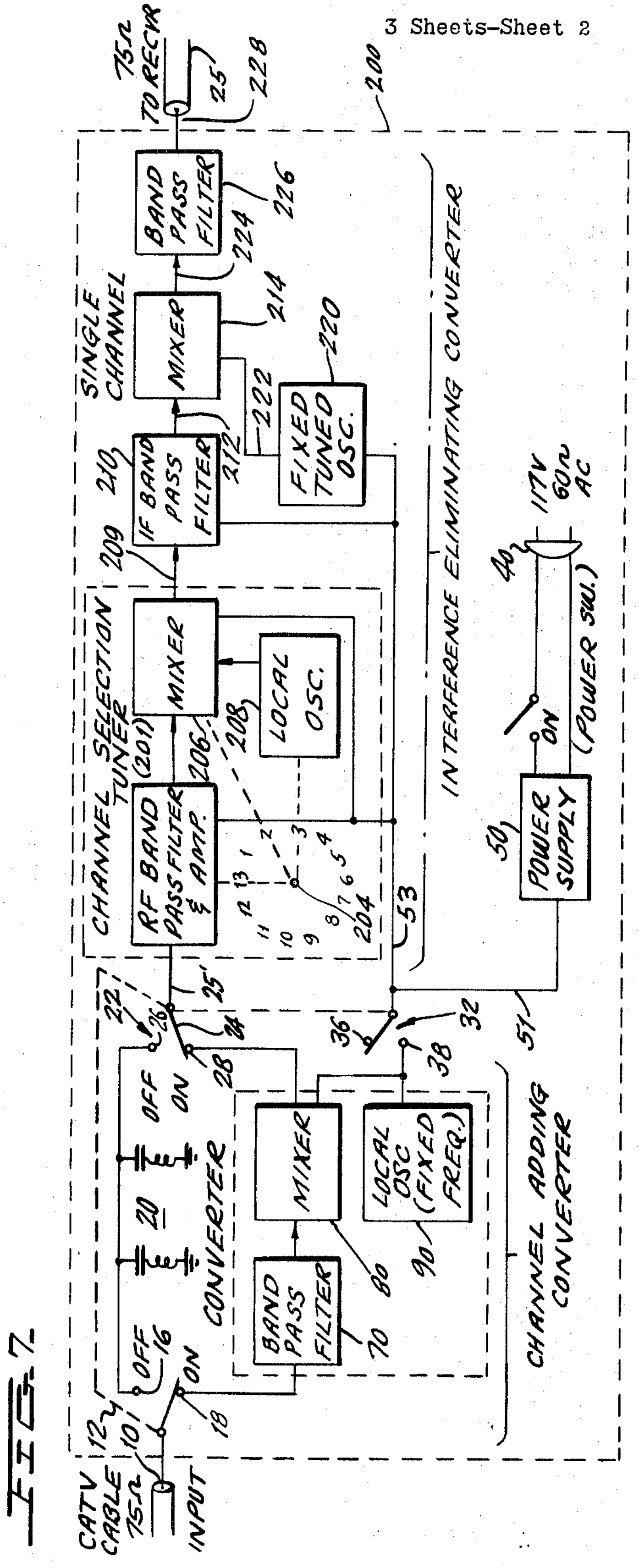
FIG. 7 shows a further embodiment of our invention, including a second frequency converter for providing still increased channel adding capabilities and avoiding interference from the locally transmitted channels.

Reference is now made to FIG. 7 which shows a modification to our invention for providing further channels in addition to the above discussed 19 channel capability. This modification has found particular applicability in those locales wherein the presence of a strong local transmitter signal in addition to the CATV transmission has caused interference. Such interference is caused by the difference in transit time between the locally transmitted signal and the CATV distribution signal, causing ghosts at the user's set. One method presently practiced for avoiding such ghosts is to first tune the subscriber's television set to a channel other than a locally transmitted channel. Hence the input pick-up of the television receiver will not be suseptible to the frequencies of local transmission. A separate frequency converter is then used between the CATV cable and the subscriber's receiver for selectively converting individual ones of the incoming broadcasts signals to the designated non-locally transmitted channel to which the subscriber's set is tuned. This separate frequency conversion device is appropriately shielded for isolating the circiuts contained therein from the locally transmitted signal, and includes band pass filters to minimize spurious signal response. In those locales which require such a frequency conversion technique for avoiding local transmission interference the additional channel frequency converter of FIGS. 1–6 may be combined therewith to provide in excess of 19 available channels for distribution through the CATV cable.

Such a dual conversion technique as shown in FIG. 7 includes, preferably within a single well shielded housing 200, a channel adding converter followed by an interference eliminating converter. The channel adding converter corresponds to that discussed in FIGS. 1 through 6 and is indicated by same numerals as FIG. 1. However, a single power supply is provided for both converters. That is, the output of power supply 50 at connector 51 is presented to both the common terminal 38 of ganged switch 32 and to bus 53 for energizing the stages of the interference eliminating converter. The output 25 of the channel adding converter will include the above discussed 19 channels at the frequencies of broadcast channels 2–13. In addition thereto there may be provided at the CATV cable input 10 one or more additional channels adjacent the VHF broadcast band, as per example a channel below channel 2 between 48 and 54 megacycles may be provided.

The output of the channel adding converter is presented to the interference eliminating converter which is substantially of the type manufactured by the assignee of the instant invention and known as the IMAGICON. The input stage thereof includes a frequency selectable R.F. band pass filter and amplifier 201 which, in addition to the conventional broadcast channels 2 through 13 tuning capabilities, includes the additional channel 1 tuning capabilities, indicated by the tuning knob 204. This frequency selectable arrangement, substantially corresponds in construction with a conventional type of commercially available VHF tuner, such as the Arbor tuner manufactured by the assignee of the instant invention, and shown in co-pending U.S. patent application (B–1.239) Ser. No. 677,105 filed Oct. 23, 1967 granted on Oct. 21, 1969 as U.S. Pat. No. 3,473,392. Such a channel selection tuner includes a frequency selectable mixer 206 and local oscillator 208 for converting individual ones of the channel 1 through 13 signals to a common I.F. (typically 43.5 megacycles) present at output 209 of the mixer. The I.F. signal is then preferably presented to an I.F. band pass filter 210 having a narrow band pass characteristic about the selected 43.5 megacycle I.F. The output 212 of the I.F. band pass filter is then presented to a second mixer 214. Fixed tuned local oscillator 220 provides a heterodining input 222 to mixer 214 such that the output 224 of mixer 214 will be at the frequency of a non-locally transmitted VHF channel. As for example, such a unit built for operation in the New York city area may have the output 224 at the frequency of VHF channel 12, intermediate 204 and 210 megacycles. The output 224 is then preferably presented to a band pass filter 226 having a band pass characteristic about the frequency of such non-locally transmitted VHF channel. The output 228 of the band pass filter is then present via coaxial cable 25 to the input of the subscriber's television set, which will be tuned to the non-locally transmitted channel.

It is therefore seen that our invention provides a frequency conversion technique, having particular applicability in conjunction with a CATV system, for adding additional channels of reception in conjunction with the broadcast VHF channels. These additional channels are provided in the frequency band intermediate VHF channels 6 and 7 and are appropriately converted to the successive frequencies of channels 7 through 13 such that the user may selectively tune individual one of such additional channels. Further in those CATV locations wherein frequency conversion may be desirable to avoid interference from the locally transmitted signals still further channel capabilities may be provided at the selective input of such additonal frequency converter.

Although there has been described preferred embodiments of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows.

1. In combination with a television receiver including frequency selectable tuning means for selecting individual ones of a fixed number of broadcast television channels that constitute a low VHF band and a high VHF band separated from the low VHF band by a vacant band, a channel adding means for receiving a plurality of additional television channels in the vacant band and converting same to the frequencies of a plurality of said fixed number of broadcast television channels in said high VHF band;

said channel adding means including a frequency converter having input means for connection to a source of said broadcast television channels and additional television channels, and an output means for connection to the frequency selectable tuning means of a television receiver;

said frequency converter including first and second paths between said input and output means;

said first path including circuit means for routing the frequencies of said broadcast television channels to said output means without altering their frequencies;

said second path including frequency conversion means for converting said plurality of additional television channels in uniformly inverted frequency relationship to the frequencies of said plurality of said fixed number of television broadcast channels, within the tuning capabilities of the television receiver frequency selectable tuning means;

said second path also including frequency filter means for preventing the frequencies of said broadcast television channels received at said input means from being routed therethrough to said output means;

switch means having a first and second position;

said switch means when in said first position establishing said first path between said input means and output means and interrupting said second path, and when in said position establishing said second path between said input means and output means and interrupting said first path; whereby with said switch means in said first position said broadcast television channels are routed to said output means, and with said switch means in said position, said broadcast television channels are prevented from reaching said output means, and said plurality of additional television channels are converted in inverted frequency relationship to the frequencies of a fixed plurality of said broadcast television channels and routed to said output means.

2. In combination with a television receiver system, as set forth in claim 1:

said input means including means for connection to a community antenna television system as the source of the broadcast television channels and additional television channels.

3. In combination with a television receiver system, as set forth in claim 1: said fixed number of broadcast television channels being low VHF band channels in the range of 54–88 and high VHF band 174–216 megacycles; said additional television channels being within the frequency range of 88–174 megacycles.

4. In combination with a television receiver system, as set forth in claim 3:

said frequency filter means providing significant signal attenuation for VHF broadcast channels within the range of 54–88 mc. and 174–216 mc., while passing substantially unimpeded the additional signal channels within the range of 88–174 mc.

5. In a community antenna television system of the type wherein a fixed plurality of successive VHF broadcast television channels within the range of 54–88 megacycles and 174–216 megacycles are distributed via cable to the television receivers of a plurality of individual subscribers, the method of adding to the distribution cable a plurality of additional successive television channels within the range of 88–174 mc., providing switch means at the subscriber's location for selectively preventing at least a portion of the normal VHF broadcast television channels from reaching the television receiver input, frequency converting said successive plurality of additional television channels to a successive plurality of television channels at frequencies corresponding to the prevented normal VHF broadcast channels, tuning the receiver input means between successive channel location to individually select desired ones of said additional television channels, providing a second frequency conversion means for receiving said normal broadcast television channels and frequency converted additional channels, and selectively converting individual ones thereof to a common VHF television channel other than a locally transmitted VHF broadcast channel, providing channel selection means within said second frequency conversion means for converting another channel at a frequency below 54 megacycles, to said common VHF television channel, and maintaining the input of the television receiver at said common VHF channel, while frequency adjusting said frequency conversion means for selecting individual ones of the received channels for conversion to said common VHF channel.

6. A television channel frequency converter for adding additional channel capabilities to a television receiver having a VHF frequency selectable tuning means for selecting individual ones of a fixed number of successive frequency broadcast channels between 54–88 megacycles and 174–216 megacycles;

said frequency converter including an input means for connection to a source of said broadcast channels and additions channels, and output means for connection to the frequency selectable tuning means of a television receiver;

filter means for selectively preventing at least the successive broadcast channels between 174 and 216 megacycles, received at said input means from presentment at said output means;

said additional channels lying within the range of 88–174 megacycles and including a plurality of successive additional television channels equal in number to the successive plurality of broadcast channels between 174–216 megacycles;

means for frequency converting said plurality of successive additional television channels to the frequencies of said successive broadcast channels within the range of 174–216 megacycles, presenting same to said output means for connection to the television receiver VHF frequency selectable tuning means, manually operable switch means having a first and second position;

said switch means first position providing circuit means for routing the received broadcast channels to said output means;

said switch means second position providing circuit means for routing said broadcast channels to said filter means and said additional channels to said frequency converter means;

whereby said first position of the switch provides the VHF broadcast channels at said output means, and said second position of the switch provides said additional channels at said output means at successive VHF broadcast channel frequencies, a second frequency conversion means for receiving said VHF broadcast television channels and frequency converted additional channels, and selectively converting individual ones thereof to a common VHF television channel other than a locally transmitted channel;

channel selection means within said second frequency conversion means for converting another channel at a frequency below 54 megacycles, to said common VHF television channel;

said second frequency conversion means connected to the output of said frequency converter, and having an output means connected to the VHF frequency selectable tuning means of the television receiver, maintained at said common VHF channel;

said frequency converter and frequency conversion means selectively providing television channels of a first, second and third type to the television receiver;

said first type being the VHF broadcast channels converted to said common VHF channel; said second type being the additional television channels frequency converted first to VHF broadcast channels, and then to said common VHF channel; and said third type being the below 54 megacycle channel converted to said common VHF channel.

7. A community antenna television system of the type wherein VHF television broadcast channels are distributed to subscribers having a television receiver capable of selecting individual ones of a fixed plurality of VHF television broadcast channels;

said VHF television broadcast channels characterized as including a first fixed number of successive low band channels and a second fixed number of successive high band channels, said low and high bands frequency separated by an intermediate frequency band;

means for providing within the coaxial cable distribution system, a plurality of successive additional channels within said intermediate frequency band and of reversed frequency characteristic relative to the frequency characteristic of each broadcast channel;

a frequency converter for converting said plurality of additional channels in uniformly inverted frequency relationship to a similar plurality of successive channels within said high frequency band;

said frequency converted additional channels being at frequencies corresponding to successive ones of the high frequency band broadcast channels;

selectable switching means for preventing the presentment of said VHF television broadcast channels to said television receiver and presenting said frequency converted additional channels to said receiver.

8. In a community antenna television system of the type wherein a fixed number of broadcast television channels that constitute a low VHF band and a high VHF band separated from the low band are distributed via cable to a plurality of television receivers, the method of adding channels to the system comprising applying signals to the cable representing a number of additional television channels within a vacant band adjacent the high VHF band and spaced in frequency in matching relationship to a corresponding number of broadcast television channels within one of said VHF bands, block-converting said signals directly from frequencies representing said number of additional television channels to frequencies representing said corresponding number of broadcast television channels, and applying said converted signals to a receiver as a substitute for standard broadcast channel signals.

9. In a community antenna television system of the type wherein a fixed number of broadcast television channels that constitute a low VHF band and a high VHF band separated from the low band are distributed via cable to a plurality of television receivers, the method of adding channels to the system comprising applying signals to the cable representing a number of additional television channels within a vacant band adjacent the high VHF band, said number of additional television channels being spaced in reversely matched frequency characteristic to the frequency characteristic of a corresponding number of broadcast television channels within one of said VHF bands, block converting said signals in inverted frequency relationship to convert directly from frequencies representing said number of additional television channels to frequencies representing said corresponding number of broadcast television channels, and applying said converted signals to a receiver as a substitute for standard broadcast channel signals.

10. In a community antenna television system that includes a cable connected to a plurality of television receivers to distribute individual ones of a fixed number of television channels that constitute a low VHF band and a high VHF band separated from the low VHF band, means for coupling to the cable a number of additional channels within a vacant band adjacent the high VHF band, said number of additional channels being spaced in frequency in matching relationship to a corresponding number of broadcast television channels within one of said VHF bands, a frequency converter for block-converting said number of additional channels directly to said corresponding number of broadcast television channels within said one VHF band and selectable switching means for preventing the presentment of said VHF television broadcast channels to said television receiver and for presenting said frequency converted additional channels to said receiver.

11. A community antenna television system of the type wherein VHF television broadcast channels are distributed to subscribers having a television receiver capable of selecting individual ones of a fixed number of broadcast television channels that constitute a low VHF band and a high VHF band separated from the low VHF band, means for providing within a coaxial cable distribution system a number of successive additional channels within a vacant band adjacent the high VHF band, said number of additional channels being matched in reversed frequency characteristic to the frequency characteristic of said corresponding number of broadcast television channels within one of said VHF bands, a frequency converter for block-converting said number of additional channels in inverted frequency relation to match directly to said corresponding number of broadcast television channels, and selectable switching means for preventing the presentment of said VHF television broadcast channels to said television receiver and for presenting the frequency converted additional channels to said receiver.

References Cited

UNITED STATES PATENTS

| | | | |
|---|---|---|---|
| 2,854,506 | 9/1958 | Pickles | 178—6 |
| 3,333,198 | 7/1967 | Mandell et al. | 325—308 |

ROBERT L. RICHARDSON, Primary Examiner

U.S. Cl. X.R.

178—6

UNITED STATES PATENT OFFICE

CERTIFICATE OF CORRECTION

Patent No. 3,562,650 Dated Feb. 9, 1971

Inventor(s) Thomas F. Gossard and Mutsuo Nakanishi

It is certified that error appears in the above-identified patent and that said Letters Patent are hereby corrected as shown below:

Col. 4, line 57: After "switch" and before "contact", the following phrase should be inserted: --12 is presented to switch --.
Col. 5, line 5: "at" should be --as--;
Col. 6, line 24: "capactior" should be --capacitor--;
line 30: "commen" should be --common--.

Signed and sealed this 6th day of July 1971.

(SEAL)
Attest:

EDWARD M.FLETCHER,JR.
Attesting Officer

WILLIAM E. SCHUYLER,
Commissioner of Pater